(12) United States Patent
Ho et al.

(10) Patent No.: US 9,096,115 B2
(45) Date of Patent: Aug. 4, 2015

(54) SYSTEM AND METHOD FOR ENERGY RECOVERY

(75) Inventors: Aaron Yun-Ren Ho, Naperville, IL (US); Aristoteles RosaNeto, Geneva, IL (US)

(73) Assignee: Caterpillar Inc., Peoria, IL (US)

( * ) Notice: Subject to any disclaimer, the term of this patent is extended or adjusted under 35 U.S.C. 154(b) by 918 days.

(21) Appl. No.: 13/298,990

(22) Filed: Nov. 17, 2011

(65) Prior Publication Data

US 2013/0125536 A1  May 23, 2013

(51) Int. Cl.
*F16D 31/02* (2006.01)
*B60K 6/12* (2006.01)
*F15B 1/02* (2006.01)
(Continued)

(52) U.S. Cl.
CPC .................. *B60K 6/12* (2013.01); *E02F 9/2075* (2013.01); *E02F 9/2217* (2013.01); *E02F 9/2253* (2013.01); *E02F 9/2289* (2013.01); *E02F 9/2292* (2013.01); *E02F 9/2296* (2013.01); *F15B 1/024* (2013.01); *F15B 7/006* (2013.01); *F15B 21/14* (2013.01); *F16H 61/4096* (2013.01); *F15B 2211/20546* (2013.01); *F15B 2211/20561* (2013.01); *F15B 2211/20569* (2013.01); *F15B 2211/212* (2013.01); *F15B 2211/27* (2013.01); *F15B 2211/50527* (2013.01); *F15B 2211/88* (2013.01); *Y02T 10/6208* (2013.01)

(58) Field of Classification Search
CPC ..... E02F 9/2217; E02F 9/2292; E02F 9/2091; E02F 9/2235; E02F 9/2271; F15B 21/14; F15B 2211/212; F15B 2211/20569; F15B 2211/20507

USPC ............................................ 60/414, 416, 484
See application file for complete search history.

(56) References Cited

U.S. PATENT DOCUMENTS 4,348,863 A * 9/1982 Taylor et al. .................... 60/327
5,634,441 A * 6/1997 Ragain ......................... 123/54.3
(Continued)

FOREIGN PATENT DOCUMENTS

EP         0280532 A2 * 8/1988 ................ F01B 3/00
JP        2007315514     12/2007
(Continued)

OTHER PUBLICATIONS

Abuelsamid, "Eaton will start production of hybrid drive system for medium duty trucks," AutoblogGreen (Feb. 10, 2007). Downloaded from http://www.green.autoblog.com/2007/02/10/eaton-will-start-production-of-hybrid-drive-system-for-medium-du/ on Nov. 17, 2011.

(Continued)

*Primary Examiner* — Edward Look
*Assistant Examiner* — Jason Mikus
(74) *Attorney, Agent, or Firm* — Leydig, Voit & Mayer, Ltd.

(57) ABSTRACT

An energy transfer system includes a power transfer mechanism, a first system, and a second system. The first system includes a first pump-motor operatively connecting the first system to the power transfer mechanism and a regenerative system operatively connected to the first pump-motor. The second system is operatively connected to the power transfer mechanism. Power is transferred between systems by the power transfer mechanism. A method of energy transfer is also provided.

19 Claims, 6 Drawing Sheets

(51) Int. Cl.
*F15B 7/00* (2006.01)
*F15B 21/14* (2006.01)
*E02F 9/20* (2006.01)
*E02F 9/22* (2006.01)
*F16H 61/4096* (2010.01)

(56) References Cited

U.S. PATENT DOCUMENTS

| | | | |
|---|---|---|---|
| 6,460,332 B1 | 10/2002 | Maruta et al. | |
| 7,386,978 B2 | 6/2008 | Ivantysynova et al. | |
| 7,401,464 B2* | 7/2008 | Yoshino | 60/414 |
| 7,472,546 B2 | 1/2009 | Anderson | |
| 7,634,911 B2 | 12/2009 | Brinkman | |
| 7,980,073 B2* | 7/2011 | Jensen | 60/414 |
| 8,058,749 B2* | 11/2011 | Radun | 307/64 |
| 2006/0218913 A1 | 10/2006 | Ivantysynova et al. | |
| 2007/0166168 A1 | 7/2007 | Vigholm et al. | |
| 2008/0148993 A1* | 6/2008 | Mack | 105/35 |
| 2010/0107624 A1* | 5/2010 | Loeffler | 60/415 |

FOREIGN PATENT DOCUMENTS

| | | |
|---|---|---|
| JP | 2008291522 | 12/2008 |
| KR | 1020060078300 | 7/2006 |
| KR | 1020110003940 | 1/2011 |

OTHER PUBLICATIONS

Anonymous, "Innas and NOAX to Show Hydraulic Series Hybrid Drivetrain at Hannover Messe," Green Car Congress (Mar. 31, 2009). Downloaded from http://www.greencarcongress.com/2009/03/innas-and-noax-to-show-hydraulic-series-hybrid-drivetrain-at-hannover-messe.html on Nov. 17, 2011.

Eaton Corporation, "Eaton, EPA showcase new fuel-saving hydraulic hybrid UPS delivery vehicle that will be road-tested in Cleveland," Press Release (Aug. 14, 2007). Downloaded from http://www.eaton.com/Eaton/OurCompany/NewsEvents/NewsReleases/98065722 on Nov. 17, 2011.

Eaton Corporation, "EPA unveils unique hydraulic hybrid diesel delivery truck with UPS, International Truck and Engine, Eaton and U.S. Army," Press Release (Jun. 21, 2006). Downloaded from http://www.eaton.com/Eaton/OurCompany/NewsEvents/NewsReleases/98065753 on Nov. 17, 2011.

Innas / NOAX, "The hydrid: A hydraulic series hybrid," (undated). Downloaded from http://www.innas.conn/Assets/files/Hydrid%20brochure.pdf on Nov. 17, 2011.

Ivantysynova, "Displacement controlled linear and rotary drives for mobile machines with automatic motion control," SAE Technical Paper series, No. 2000/01/2562 (Sep. 11, 2000).

Ochiai et al., "Hybrid construction machinery," Proceedings of the 7th JFPS Symposium on Fluid Power (Sep. 15-18, 2008).

Rexroth-Bosch, "Hydraulic Hybrid from Rexroth: Hydrostatic Regenerative Braking System HRB," Product Catalog RE 98310/08. 10 (undated).

* cited by examiner

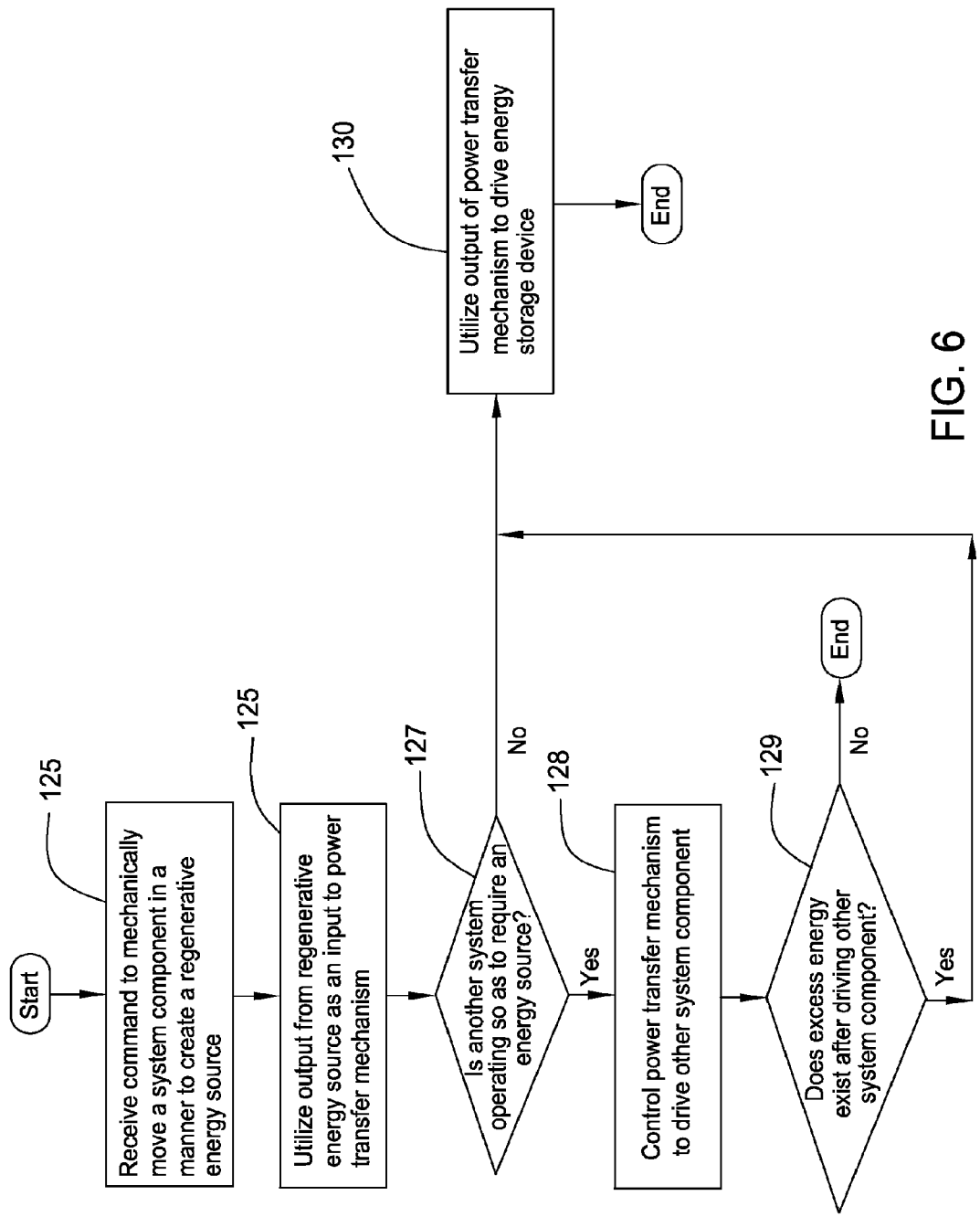

SYSTEM AND METHOD FOR ENERGY RECOVERY

TECHNICAL FIELD

This disclosure relates generally to a system and method for recovering energy within a machine and, more particularly, to a system and method of recovering energy and sharing such energy between systems of a machine.

BACKGROUND

Machines often use one or more hydraulic actuators to accomplish a variety of tasks. These actuators are fluidly connected to pumps on the machine that provide pressurized fluid to chambers within the actuators. As the pressurized fluid moves into or through the chambers, the pressure of the fluid acts on hydraulic surfaces of the chambers to effect movement of the actuator and a connected work tool or implement. When the pressurized fluid is drained from the chambers it returns to a low pressure sump on the machine. A significant amount of energy may be required to operate a plurality of hydraulic actuators. In order to increase efficiency, some machines use regenerative systems to recover energy during the operation of such hydraulic systems.

Mobile machines also use some type of propulsion system to drive the machine such as a hydraulic system or a hydrostatic system. These propulsion systems may include a regenerative system to increase the efficiency of operation.

Energy that is recovered by a regenerative system may be stored in various types of energy storage devices or systems. For example, energy recovered in a hydraulic system is often stored in a hydraulic accumulator, and energy stored in an electrical system is often stored in a battery or capacitor system. However, certain inefficiencies exist when storing energy as well as when subsequently converting it back into usable power. Accordingly, some machines share energy between systems. U.S. Pat. No. 7,472,546 discloses a hydrostatic regenerative braking system that stores energy in a hydraulic accumulator. The stored energy may be subsequently used by directing pressurized hydraulic fluid as desired to propel the machine or to drive a secondary steering system.

SUMMARY

An energy transfer system for sharing energy between systems of a machine is provided. In one aspect, an energy transfer system includes a power transfer mechanism, a first system, a second system and an energy storage system. The first system includes a first pump-motor operatively connecting the first system to the power transfer mechanism. The first pump-motor is selectively driven by and provides power to the power transfer mechanism and is configured to selectively provide and receive a first pressurized fluid. A first operational component is operatively connected to the first pump-motor and may be configured to perform mechanical work. A regenerative system is operatively connected to the first pump-motor and is configured to recover regenerated energy from the first system. The second system includes a second coupling component operatively connecting the second system to the power transfer mechanism. A second operational component is operatively connected to the second coupling component and may be configured to perform mechanical work. The energy storage system is operatively connected to the power transfer mechanism and is configured to store energy including regenerated energy recovered by the regenerative system.

In another aspect, a method is provided for operating an energy transfer system having a power transfer mechanism, a first system and a second system. The first system includes a first pump-motor operatively connecting the first system to the power transfer mechanism to selectively be driven by and provide power to the power transfer mechanism. The pump-motor is configured to selectively provide and receive a first pressurized fluid and a first operational component is operatively connected to the first pump-motor and may be configured to perform mechanical work. A regenerative system is provided for recovering regenerated energy from the first system. The second system is operatively connected to the power transfer mechanism. The method includes directing a rotational input to the power transfer mechanism from the first system to transfer regenerated energy from the first system to the power transfer mechanism and directing a rotational output from the power transfer mechanism to the second system to transfer at least some of the regenerated energy from the first system to the second system.

BRIEF DESCRIPTION OF THE DRAWINGS

FIG. 6 is a flowchart illustrating a process of mechanically moving a system component in a manner to create a regenerative energy source.

DETAILED DESCRIPTION

Figure 1:
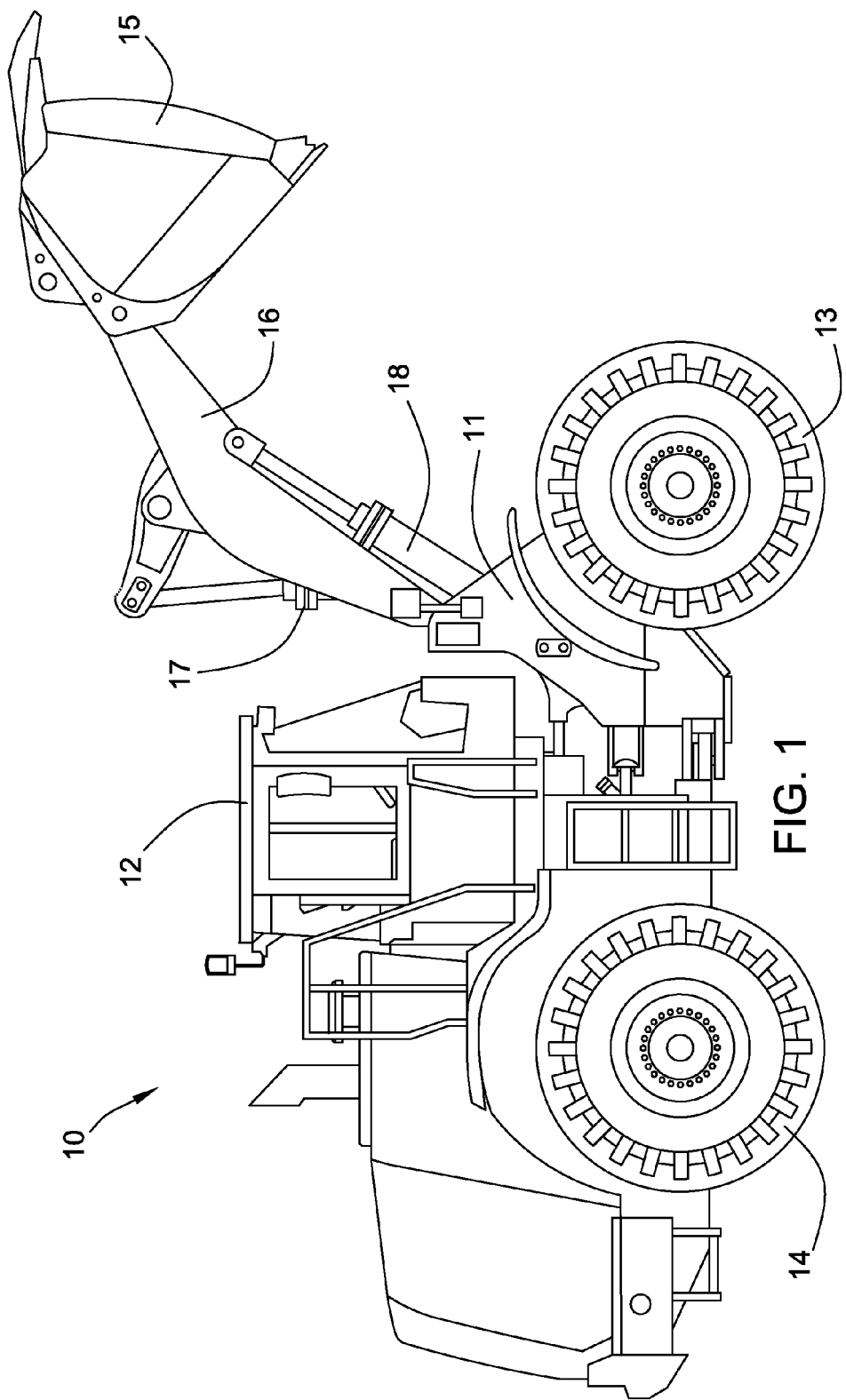
FIG. 1 is a side view of a wheel loader according to the concepts of the present disclosure.

Referring to FIG. 1, an exemplary machine 10, such as wheel loader, has a body 11, a cab 12, a pair of front tires 13 and a pair of rear tires 14. An implement 15 such as a bucket may be supported by a boom 16 that is mounted on body 11. Implement 15 may be controlled by a first actuator 17 such as a tilt cylinder and boom 16 may be controlled by a second actuator 18 such as a boom cylinder. Boom 16 may be a component of a linkage that operates with the first actuator 17 and the second actuator 18 to control the position and orientation of the implement 15. Although the machine 10 is depicted as a wheel loader, it may be any type of machine with multiple systems and components configured to perform various types of operations such as excavators, dozers, backhoes, motor graders, haul trucks, or any other type of machine that is mobile or fixed.

Figure 2:
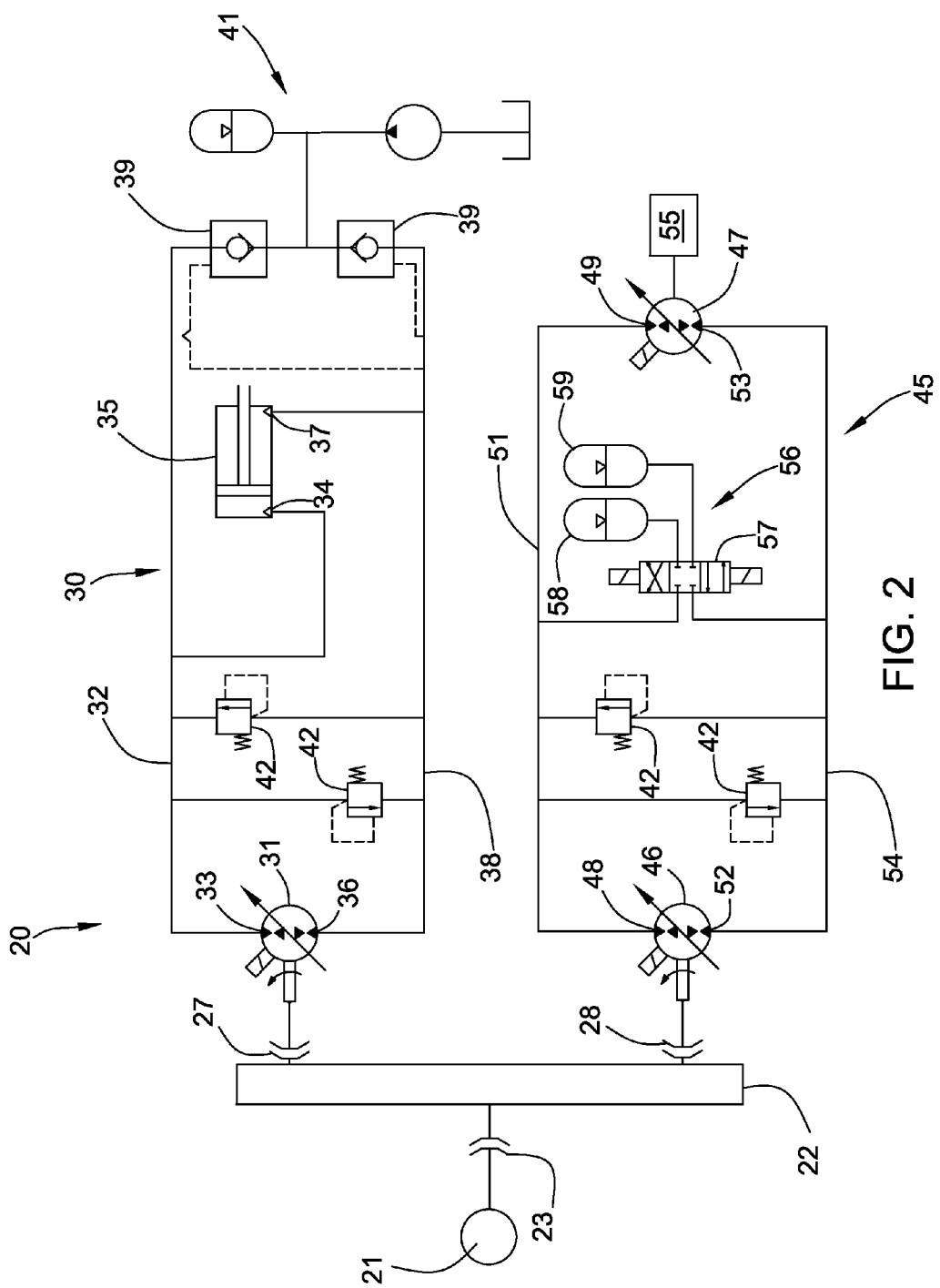
FIG. 2 is a schematic illustration of a first embodiment of the energy transfer system of the present disclosure.

As illustrated in FIG. 2, machine 10 includes an energy transfer system 20 with a plurality of systems that cooperate to perform many functions including moving implement 15 and propelling or driving the machine 10 as desired. More specifically, a prime mover 21 may be operatively connected or coupled to a power transfer mechanism 22 with a prime mover clutch positioned between the prime mover 21 and the power transfer mechanism 22 to control the input from the prime mover to the power transfer mechanism. Prime mover 21 may be configured as a diesel engine, a gasoline engine as well as other types of engines and power generating mechanisms to selectively provide prime mover rotational input to the power transfer mechanism through the engagement of prime mover clutch 23.

Power transfer mechanism 22 may include a series of gears (not shown) and other components that operate together to permit energy or power to be transferred between various systems of machine 10. In one example, power transfer mechanism 22 may be a power take-off box or transmission that is operatively connected to the prime mover 21 and a plurality of systems to selectively permit energy or power to be shared or transferred through rotating shafts that interconnect the power transfer mechanism to the prime mover and the systems. With such a configuration, excess energy or power may be transferred through the power transfer mechanism to another component or system operatively connected to the power transfer mechanism to minimize the input required from the prime mover 21 and thus increase the efficiency of the operation of machine 10.

Referring to FIG. 2, energy transfer system 20 has a power transfer mechanism 22 that is operatively connected to a first system 30 and a second system 45. Each of the first system 30 and the second system 45 may be configured to perform some type of mechanical work. Although depicted as an implement system and a propulsion system, respectively, first system 30 and second system 45 may be any other type of system used within machine 10 including, for example, steering, transmission, and cooling. A first system clutch 27 is provided between the power transfer mechanism 22 and the first system 30 to selectively control the engagement between the power transfer mechanism 22 and the first system. A second system clutch 28 is provided between the power transfer mechanism 22 and the second system 45 so as to selectively control the engagement between the power transfer mechanism 22 and the second system. As depicted, the first system 30 may be a hydraulic system for controlling a fluid or hydraulic actuator or cylinder such as first actuator 17 or second actuator 18 or any other actuator, and second system 45 may be a hydrostatic propulsion system with a regenerative capabilities.

First system 30 includes a first coupling component configured as a variable displacement first pump-motor 31 that may be operatively connected to power transfer mechanism 22 through first system clutch 27. First pump-motor 31 operates to convert power from the power transfer mechanism 22 into hydraulic flow to provide pressurized fluid to the first system 30 and also to convert the flow of pressurized fluid into rotational input that is transferred into the power transfer mechanism 22. A first hydraulic line 32 fluidly couples a first side 33 of first pump-motor 31 to a first end 34 of hydraulic actuator 35. A second side 36 of first pump-motor 31 is fluidly coupled to a second end 37 of hydraulic actuator 35 through second hydraulic line 38. Check valves 39 are connected to the first end 34 and the second end 37 of the hydraulic actuator 35 and control the direction of the flow between the hydraulic actuator and fluid reservoir system 41. Pressure relief valves 42 may be provided between first hydraulic line 32 and second hydraulic line 38, if desired.

Hydraulic actuator 35 may be extended by configuring first pump-motor 31 to have a positive displacement and rotating the first pump-motor. Such configuration and rotation will cause hydraulic fluid to enter first end 34 of hydraulic actuator 35 and extend the shaft of the actuator to perform mechanical work such as lifting boom 16. In some instances, retraction of the shaft of hydraulic actuator 35 may be accomplished by configuring the first pump-motor 31 to have a negative displacement and permitting the weight of the components connected to the hydraulic actuator 35 to force hydraulic fluid from the first end 34 of the hydraulic actuator and towards second side 36 of the first pump-motor 31. Provided that the weight of the components connected to the hydraulic actuator 35 is sufficient, regenerative energy may be recovered from the first system 30 so that first pump-motor 31 may operate as a motor and provide a rotational input to power transfer mechanism 22. In this way, power may be provided or transferred to the first system 30 through the power transfer mechanism 22 by operating first pump-motor 31 with a positive displacement (and thus extending hydraulic actuator 35), and power may be removed or transferred from first system 30 by operating first pump-motor 31 with a negative displacement (and thus retracting the hydraulic actuator).

The second system 45 may be configured as a hydrostatic propulsion system with regenerative capabilities. A second coupling component or drive mechanism configured as a variable displacement second pump-motor 46 is operatively connected to the power transfer mechanism through the second system clutch 28 so as to permit selective engagement between the power transfer mechanism 22 and the second system 45. The second pump-motor 46 is operatively connected to an operational component that may perform mechanical work such as variable displacement drive pump-motor 47 that functions as a propulsion motor. The first side 48 of second pump-motor 46 is fluidly coupled to a first side 49 of drive pump-motor 47 by first hydraulic line 51 and a second side 52 of second pump-motor 46 is fluidly coupled to a second side 53 of drive pump-motor 47 by a second hydraulic line 54. Drive pump-motor 47 may be operatively connected to a tractive component 55 such as the wheels of the machine 10 or other tractive components.

Energy storage system 56 may be positioned within second system 45 to store energy as desired and to act as an energy source when additional energy is needed or to reduce the use of prime mover 21. More specifically, a directional control valve 57 may be provided between the first hydraulic line 51 and the second hydraulic line 54 of second system 45 to control the flow of hydraulic fluid to and from first accumulator 58 and second accumulator 59. Each of the first accumulator 58 and the second accumulator 59 may be any type of energy storage system such as a vessel filled with compressible gas and configured to store pressurized fluid for future use as a source of power. The compressible gas may include, for example, nitrogen or another compressible gas. Due to the compressible nature of the gas, such gas acts as a spring and is compressed as the fluid flows into the accumulator. Fluid will flow into the accumulator if the directional control valve 57 is properly positioned and exceeds a predetermined pressure. The accumulators may have alternate configurations such as a spring-biased accumulator or any other type of fluid storage device.

As depicted in FIG. 2, directional control valve 57 permits three modes of operation. In a first mode of operation, flow is permitted between the first accumulator 58 and the first hydraulic line 51, as well as between the second accumulator 59 and the second hydraulic line 54. In a second configuration, flow is permitted between first accumulator 58 and the second hydraulic line 54, as well as between second accumulator 59 and the first hydraulic line 51. In the third configuration, flow to and from the first accumulator 58 and the second accumulator 59 is blocked or prevented by the directional control valve 57.

By configuring the second pump-motor 46 with a positive displacement and the drive pump-motor 47 with a positive displacement and engaging second system clutch 28 so as to provide a rotational input from power transfer mechanism 22 to second system 45, the second pump-motor provides pressurized fluid to the drive pump-motor 47 to propel the machine 10 in a desired direction. If the machine 10 is moving and the operator applies a brake pedal, the second pump-motor 46 and the drive pump-motor 47 are configured to act as a hydraulic regenerative braking system so that the drive pump-motor 47 acts as a pump to slow the machine 10 and second pump-motor 46 may act as a pump to provide a rotational input to power transfer mechanism 22 or store energy in energy storage system 56.

Through the configuration depicted in FIG. 2, prime mover 21 may be used to power first system 30 and second system 45 and energy may be shared between the first system 30 and the second system 45. By selectively engaging prime mover clutch 23, first system clutch 27 and second system clutch 28, as well as controlling the configurations of the first pump-motor 31, the second pump-motor 46 and the drive pump-motor 47, energy may be shared between the first system 30 and the second system 45. If desired, energy may be shared with the prime mover 21 such as for re-starting an engine. Sharing of energy between the systems permits improved efficiency of the operation of the machine 10.

A control system (not shown) may be provided to control the operation of the machine 10 in an efficient manner. More specifically, the control system may include an electronic control module or controller. The control system may include one or more input devices to control the energy sharing between the systems and to assist in operating the prime mover 21 in an efficient manner. Such input signals may be representative of various operating parameters of the prime mover 21, the power transfer mechanism 22 and the various systems operatively connected to the power transfer mechanism.

The controller may be an electronic controller that operates in a logical fashion to perform operations, execute control algorithms, store and retrieve data and other desired operations. The controller may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the controller such as power supply circuitry, signal conditioning circuitry, driver circuitry, and other types of circuitry. The controller may be a single controller or may include more than one controller disposed to control various functions and/or features of the machine 10. The term "controller" is meant to include one or more controllers that may be associated with the machine 10 and that may cooperate in controlling various functions and operations of the machine. The functionality of the controller may be implemented in hardware and/or software without regard to the functionality. The controller may rely on one or more data maps relating to the operating conditions of the machine 10 that may be stored in the memory of controller. Each of these maps may include a collection of data in the form of tables, graphs, and/or equations. The controller may use the data maps to determine how to share energy between the first system 30 and the second system 45, when and how to operate prime mover 21 and when to store energy in an energy storage system to maximize the efficiency of the machine 10.

In operation, if it is desired to move hydraulic actuator 35 so as to perform work such as lifting boom 16, first system clutch 27 is engaged and first pump-motor 31 is configured with a positive displacement. Power may be provided through the power transfer mechanism 22 from one or more input sources to the power transfer mechanism. One source of rotational input to the power transfer mechanism may be prime mover 21 through the engagement of prime mover clutch 23. Instead of or in addition to the rotational input from prime mover 21, the power for driving first pump-motor 31 may be delivered by second system 45. In one mode of operation, energy stored within first accumulator 58 may be used to actuate hydraulic actuator 35. Second pump-motor 46 is configured with a positive displacement and drive pump-motor 47 is configured with a zero displacement. Directional control valve 57 is configured so that the first accumulator 58 is connected to a second hydraulic line 54 and second accumulator 59 is connected to first hydraulic line 51. High pressure fluid flows from the first accumulator 58 through second hydraulic line 54 and causes the second pump-motor 46 to rotate. The rotation of second pump-motor 46 acts as an input through second system clutch 28 to provide a rotational input to the power transfer mechanism 22. The rotational input into power transfer mechanism 22 is transferred to the first system 30 to extend the hydraulic actuator 35.

In a second mode of operation, if the machine 10 is moving and the operator applies a brake to slow or stop the movement of the machine, the second system 45 may be configured to act as a regenerative braking system. In such case, the drive pump-motor 47 acts to slow the machine 10 and directs pressurized fluid to second pump-motor 46 which acts as a pump to provide a rotational input to power transfer mechanism 22. This rotational input may then drive the first pump-motor 31 as described above. In the alternative, the pressurized fluid may be directed to the energy storage system 56 for future use.

Second system 45 is depicted in FIG. 2 to include a hydrostatic propulsion system with a regenerative braking system and an energy storage system. Power or input to the second system 45 may be provided through the power transfer mechanism 22 by prime mover 21 and/or first system 30. To operate as a propulsion system, second pump-motor 46 and drive pump-motor 47 are both configured with positive displacements so that rotation of the second pump-motor 46 creates a positive displacement that forces the rotation of drive pump-motor 47 to rotate the tractive component 55. If the second system 45 is to be powered by the prime mover 21, the prime mover clutch 23 is engaged to operatively connect or couple the prime mover 21 to the power transfer mechanism 22. If the second system is to be powered by regenerated energy from the first system 30, the first system clutch 27 is engaged to operatively connect or couple the first system 30 to the power transfer mechanism 22. If regenerated energy from the first system 30 is insufficient to power the second system 45, additional rotational input may be provided by also operating the prime mover 21 so as to provide prime mover rotational input to the power transfer mechanism 22.

Although the embodiment of FIG. 2 includes a hydraulic first system 30 such as a system for operating a hydraulic actuator 35 and a hydraulic second system 45 such as a hydrostatic propulsion system, the parallel nature of the first system 30 and the second system 45 relative to the power transfer mechanism 22 permits the addition of a plurality of additional systems and also permits the addition of non-hydraulic systems such as an electric drive. In addition, since the first system 30 and second system 45 may be physically separate from each other, their hydraulic fluids may be physically separated from each other. As a result, a first pressurized fluid may be used within the first system 30 while a second pressurized fluid may be used within the second system 45. This may be advantageous when, for example, the first system and second system are configured so that it is desirable to use different types of hydraulic fluid.

Figure 3:
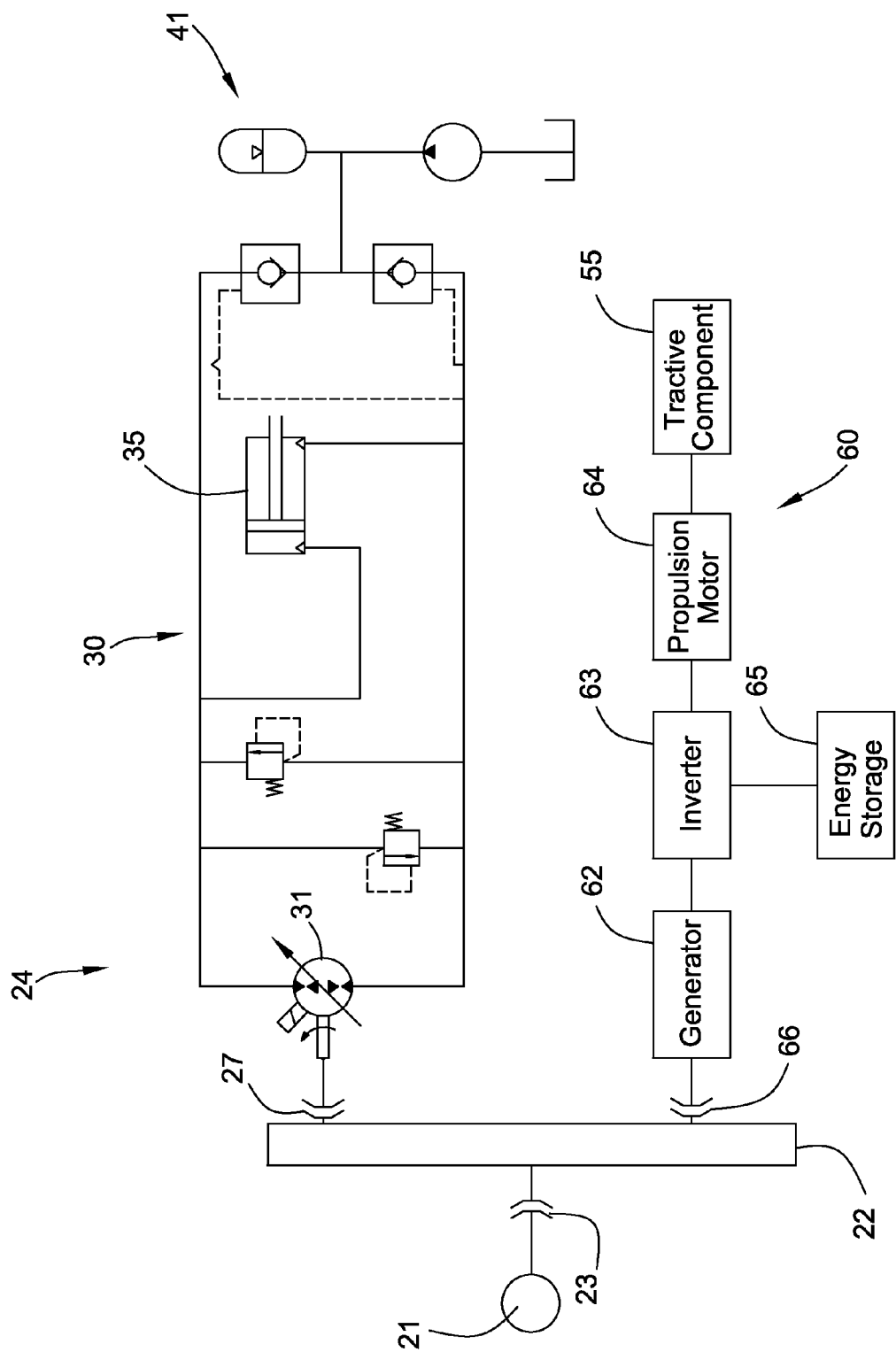
FIG. 3 is a schematic illustration of a second embodiment of the energy transfer system with the hydrostatic drive system replaced by an electric drive system.

Referring to FIG. 3, an alternate embodiment of an energy transfer system 24 is depicted with the second system 45 of FIG. 2 replaced by an electric drive system 60. Electric drive system 60 includes a drive mechanism such as a generator 62, an inverter system 63, a propulsion motor 64 and an energy storage system 65 including an energy storage device such as a capacitor system or battery. An electric drive system clutch 66 is provided between the power transfer mechanism 22 and the electric drive system 60 to selectively control the engagement between the power transfer mechanism and the electric drive system. The generator 62 receives a rotational input from the power transfer mechanism 22 and converts it into electricity. The inverter system 63 may include one or more inverters and rectifiers for converting the electricity generated by the generator 62 into a desired form to drive propulsion motor 64 or charge the energy storage system 65. The propulsion motor 64 may be coupled to a tractive component such as the wheels of machine 10. The propulsion motor 64 may also operate as a component of an electrical regenerative braking system through which the machine 10 may be slowed and kinetic energy of the machine converted into electricity. In such case, the inverter system 63 may modify the electricity for storage within the energy storage system 65 or may provide it to the generator 62 which will convert the electricity into a rotational input into the power transfer mechanism 22.

With the system depicted in FIG. 3, energy may be shared between the first system 30 and the electric drive system 60 through the power transfer mechanism 22 even though the first system is operated hydraulically and the electric drive system 60 is operated electrically. More specifically, energy regenerated or recovered from first system 30 when retracting actuator 35 may be converted by first pump-motor 31 and provided to power transfer mechanism 22 as rotational input. This rotational input may then be transferred to the electric drive system 60 to create an electrically generated input and either drive the propulsion motor 64 or charge the energy storage system 65. Similarly, energy regenerated or recovered by regenerative braking within electric drive system 60 may be transferred back to the power transfer mechanism 22 as described above and used by the first system 30 to extend the hydraulic actuator 35. In addition, energy may also be transferred from the electric drive system 60 to the first system 30 by transferring energy from the energy storage system 65 through generator 62 into power transfer mechanism 22 and then into first system 30. The transfer of energy between the first system 30 and the electric drive system 60 decreases the amount of energy required from prime mover 21 and thus increases the efficiency of the machine 10.

Figure 4:
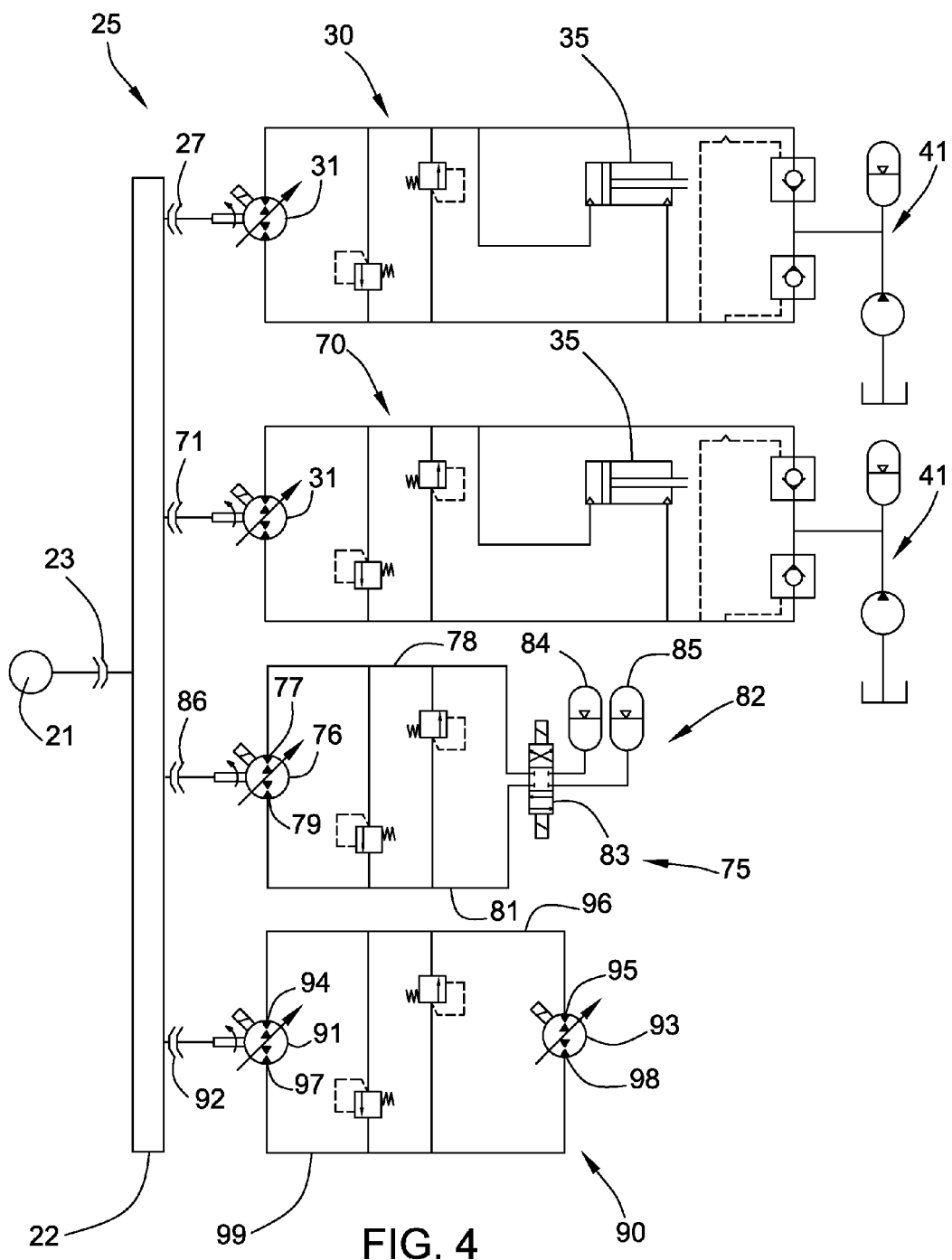
FIG. 4 is a schematic illustration of a third embodiment of an energy transfer system according to the present disclosure.

FIG. 4 depicts an alternate embodiment of operative systems with first system 30, an additional hydraulic system 70, a third system 75 and a fourth system 90. First system 30 is configured to operate, for example, as a first implement system with first hydraulic actuator 35, and additional hydraulic system 70 is provided as, for example, a second implement system that is substantially identical to first system 30 and may operate in a similar manner. Like components are identified by like reference numbers and the description thereof is not repeated herein. Additional hydraulic system 70 is operatively connected to power transfer mechanism 22 by additional hydraulic clutch 71.

Third system 75 is operatively connected to the power transfer mechanism 22 and operates as a separate energy storage system. Third system 75 includes a variable displacement third pump-motor 76 with a first end 77 connected to a first hydraulic line 78 and a second end 79 connected to a second hydraulic line 81. An energy storage system 82 is operatively connected to the first hydraulic line 78 and the second hydraulic line 81 by a directional control valve 83. Energy storage system 82 may include a first accumulator 84 and a second accumulator 85. Flow of hydraulic fluid to and from each of the first accumulator 84 and the second accumulator 85 and the first hydraulic line 78 and the second hydraulic line 81 is controlled by the position of the directional control valve 83. A third system clutch 86 is provided between the power transfer mechanism 22 and the third system 75 to selectively control the engagement between the power transfer mechanism and the third system.

Fourth system 90 is operatively connected to the power transfer mechanism 22 and operates as a hydrostatic propulsion system with a regenerative braking system. Fourth system 90 includes a fourth coupling component or drive mechanism configured as a variable displacement fourth pump-motor 91 operatively connected to the power transfer mechanism 22 through the fourth system clutch 92 so as to permit selective engagement between the power transfer mechanism 22 and the fourth system 90. The fourth pump-motor 91 is operatively connected to an operational component performing mechanical work such as variable displacement fourth drive pump-motor 93 that functions as a propulsion motor. The first side 94 of fourth pump-motor 91 is fluidly coupled to a first side 95 of fourth drive pump-motor 93 by first hydraulic line 96 and a second side 97 of fourth pump-motor 91 is fluidly coupled to a second side 98 of fourth drive pump-motor 93 by a second hydraulic line 99. Fourth drive pump-motor 93 may be operatively connected to a tractive component such as the wheels of the machine 10 or other tractive components. It can be seen that in the embodiment of FIG. 4, the energy storage system and the drive system are separate systems as compared to the embodiments of FIGS. 2 and 3 in which the energy storage system is a component of the drive system. The operation of the components of each system may be substantially as described above with respect to FIG. 2 and is not repeated herein. Referring to FIGS. 2-4, it can be understood that the energy storage system may be operatively connected to the power transfer mechanism 22 directly such as with third system 76 or indirectly as a component of a system with other functionality such as second system 45 or electric drive system 60.

Figure 5:
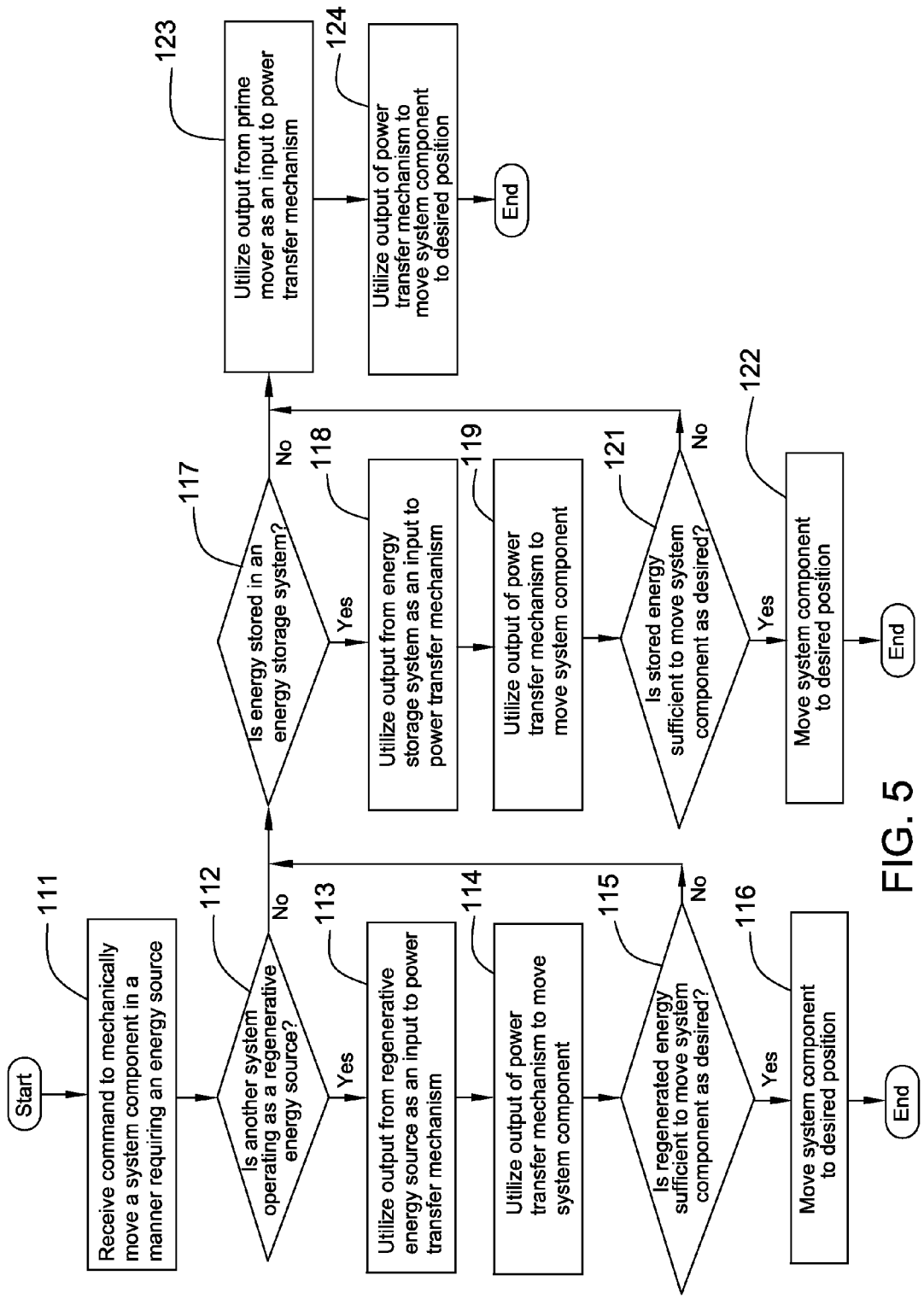
FIG. 5 is a flowchart illustrating a process of mechanically moving a system component in a manner requiring an energy source.

Referring to FIG. 5, a flowchart is depicted showing a process for the operation of the energy transfer systems of FIGS. 2-4 while a system component is moved in a manner requiring energy from an energy source. The operations described below relative to the flowchart may be performed by a controller in accordance with appropriate controlled algorithms being executed therein. That is, the disclosed processes may be executed by a controller via the execution of computer-executable instructions that are read from a computer-readable medium. The methodology is applicable to any controller that monitors the operation of the system or systems of the machine 10. Also, while a particular sequence may be shown for convenience, the machine 10 may actually operate in a different sequence as compared to those identified in the flowcharts.

At stage 111, the controller receives a command to mechanically move a system component in a manner that will require energy from an energy source. At stage 112, the controller determines whether one or more other systems are operating as a regenerative energy source so as to provide energy to the power transfer mechanism 22. If another system is operating as a regenerative energy source, output from that other system is provided as input to the power transfer mechanism 22 at stage 113. At stage 114, the regenerated energy from the other system is transferred to the power transfer mechanism 22 to the system component to move it in a desired manner. At stage 115, the controller determines whether the recovered energy from the regenerative energy source is sufficient to move the system component as desired. If the recovered energy is sufficient, the system component is moved as desired at stage 116 until it reaches its desired position.

If another system is not operating as a regenerative energy source at stage 112 or the recovered energy from the regenerative energy source is insufficient to move the system component as desired at stage 115, the controller determines at stage 117 whether energy is stored in an energy storage system. If energy is stored in an energy storage system, energy may be transferred from the energy storage system to the power transfer mechanism 22 at stage 118. The system component is moved at stage 119 by energy transferred from the energy storage system to the power transfer mechanism 22. At stage 121, the controller determines whether the stored energy from the energy storage system is sufficient to move the system component as desired. If the stored energy is sufficient, the system component is moved as desired at stage 122 until it reaches its desired position.

If energy from a regenerative energy source as well as energy stored in an energy storage system are insufficient to move the system component as desired, output from the prime mover 21 is utilized as an input to the power transfer mechanism 22 at stage 123. The system component is moved as desired at stage 124 until it reaches its desired position.

FIG. 6 depicts a flowchart showing a process for the operation of machine 10 and the systems of FIGS. 2-4 and the transfer of energy between systems while a system component is moved in a manner to create a regenerative energy source. The operations described below relative to the flowchart may be performed by a controller in accordance with appropriate controlled algorithms being executed therein. At stage 125, the controller receives a command to mechanically move a system component in a manner that will create a regenerative energy source. At stage 126, output from the regenerative energy source is used as input to the power transfer mechanism 22. The controller determines at stage 127 whether another system is operating so as to require an energy source. If another system is so operating, energy is transferred at stage 128 from the power transfer mechanism 22 to the system requiring an energy source.

The controller determines at stage 129 whether any recovered or regenerative energy exists after moving the system component as desired. If another system is not operating so as to require an energy source at stage 127 or any excess or regenerated energy exists after moving the system component at stage 129, the energy within the power transfer mechanism 22 is utilized at stage 130 to charge the energy storage system 56. In such case, if the energy storage unit 56 is fully charged, the prime mover 21 may be engaged to retard or dissipate the energy within the power transfer mechanism 22.

INDUSTRIAL APPLICABILITY

The industrial applicability of the system described herein will be readily appreciated from the foregoing discussion. The foregoing discussion is applicable to machines having multiple systems that require power to drive or operate the systems and that further include at least one regenerative system. With reference to FIG. 2, an exemplary energy transfer system 20 permits power to be transferred from one system to another through a power transfer mechanism 22. More specifically, each of the systems may be configured to receive power from the power transfer mechanism to drive the operative component of that system without regard to the type of input. For example, the power transfer mechanism 22 may power multiple systems that are each hydraulically driven and use different types of hydraulic or other working fluid. In addition, one or more of the systems may be electrically driven.

Power may be supplied to the power transfer mechanism 22 by the prime mover 21. In addition, systems that include regenerative systems or energy storage systems 56 may also supply power back to the power transfer mechanism 22. To the extent that regenerative energy is being recovered by a regenerative system and such energy is not required to operate one of the systems, the regenerative energy may be transferred by the power transfer mechanism 22 to an energy storage system 56 for future use. If desired, the energy transfer system 20 may be configured to operate the prime mover at an optimum rate when the energy storage system 56 is not fully charged to maximize the efficiency of operation with excess power being stored in the energy storage system 56. The energy transfer system 20 may provide a weight advantage by reducing the number of energy storage systems 56 required by the machine 10 and provides an efficiency advantage by reducing the number of valves required and thus reducing the number of pressure drops within the various systems.

In one aspect, an energy transfer system 20 includes a power transfer mechanism 22, a first system 30, a second system 45 and an energy storage system 56. The first system includes a first pump-motor 31 operatively connecting the first system to the power transfer mechanism 22. The first pump-motor 31 is selectively driven by and provides power to the power transfer mechanism 22 and is configured to selectively provide and receive a first pressurized fluid. A first operational component is operatively connected to the first pump-motor 31 and may be configured to perform mechanical work. A regenerative system is operatively connected to the first pump-motor 31 and is configured to recover regenerated energy from the first system 30. The second system 45 includes a second coupling component operatively connecting the second system to the power transfer mechanism 22. A second operational component is operatively connected to the second coupling component and may be configured to perform mechanical work. The energy storage system 56 is operatively connected to the power transfer mechanism 22 and is configured to store energy including regenerated energy recovered by the regenerative system.

During operation, when a command is received to mechanically move a system component in a manner requiring energy, the energy transfer system 20 determines whether another system is operating as a regenerative energy source. If another system is so operating, energy from the regenerative energy source is utilized as input to the power transfer mechanism 22 so that the amount of regenerated energy that will be stored is minimized. This regenerated energy is transferred to the power transfer mechanism to the system of the system component that is to be moved. If the regenerated energy is insufficient to move the system component as desired or another system was not operating as a regenerative energy source, the energy transfer system 20 determines whether energy is stored in an energy storage system 56. If energy is stored in an energy storage system 56, output from the energy storage system may be used as input to the power transfer mechanism 22. As a result, energy transferred from the energy storage system 56 through the power transfer mechanism 22 may be used as input to the system having the system component that is to moved. If no energy is stored in an energy storage system or if the stored energy is insufficient to move the system component as desired, output from the prime mover 21 is used as input to the power transfer mechanism 22. This output from the prime mover is transferred through the power transfer mechanism 22 and used as input into the system having the system component.

Upon receipt of a command to mechanically move a system component in a manner to create a regenerative energy source, the energy transfer system 20 utilizes output from the regenerative energy source as an input to the power transfer mechanism 22. If another system is operating so as to require energy, the power transfer mechanism 22 is controlled so as to transfer the regenerated energy to the system requiring an energy source. If another system is not operating so as to require energy, or if excess energy exists after driving the system requiring the energy source, the output of the power transfer mechanism is utilized to charge the energy storage system 56.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. An energy transfer system comprising:
   a prime mover;
   a power transfer mechanism operatively connected to the prime mover;
   a first system, the first system including a first pump-motor operatively connecting the first system to the power transfer mechanism, the first pump-motor being selectively driven by and providing power to the power transfer mechanism and being configured to selectively provide and receive a first pressurized fluid, a first operational component operatively connected to the first pump-motor;
   a first regenerative system operatively connected to the first pump-motor and being configured to recover regenerated energy from the first system;
   a second system, the second system including a second coupling component operatively connecting the second system to the power transfer mechanism, a second operational component operatively connected to the second coupling component, the second operational component being selectively driven by and providing power to the power transfer mechanism;
   a second regenerative system operatively connected to the second operational component and being configured to recover regenerated energy from the second system; and
   an energy storage system operatively connected to the power transfer mechanism and being configured to store energy including the regenerated energy recovered by the first regenerative system and the second regenerative system.

2. The energy transfer system of claim 1, wherein the first system has a first implement system including a first actuator configured to selectively receive the pressurized fluid from the first pump-motor and to selectively provide the pressurized fluid to the first pump-motor.

3. The energy transfer system of claim 2, wherein the second system has a second implement system including a second pump-motor operatively connecting the second system to the power transfer mechanism, the second pump-motor being selectively driven by and providing power to the power transfer mechanism and being configured to selectively provide and receive a second pressurized fluid, and the first pressurized fluid and the second pressurized fluid being physically separated from each other.

4. The energy transfer system of claim 1, wherein the second system has a propulsion system including a drive mechanism, and a propulsion motor operatively connected to the drive mechanism for driving a tractive component.

5. The energy transfer system of claim 4, wherein the second system further includes a regenerative braking system.

6. The energy transfer system of claim 4, wherein the drive mechanism is a pump-motor and the propulsion motor is hydraulically driven.

7. The energy transfer system of claim 6, wherein the energy storage system is a component of the second system and includes an accumulator.

8. The energy transfer system of claim 4, wherein the drive mechanism is a generator and the propulsion motor is electrically driven.

9. The energy transfer system of claim 8, wherein the energy storage system is a component of the second system and includes a capacitor system.

10. The energy transfer system of claim 1, further including a third system having an electric drive system with a generator, a propulsion motor and an electrical regenerative braking system operatively connected to the generator, the generator further being operatively connected to the power transfer mechanism and the propulsion motor for driving a tractive component, and the third system being selectively driven by and providing power to the power transfer mechanism.

11. A method of operating an energy transfer system having a power transfer mechanism, a first system including a first pump-motor operatively connecting the first system to the power transfer mechanism to selectively be driven by and provide power to the power transfer mechanism, the first pump-motor being configured to selectively provide and receive a first pressurized fluid and a first operational component operatively connected to the first pump-motor, a first regenerative system for recovering regenerated energy from the first system, a second system including a second coupling component operatively connecting the second system to the power transfer mechanism, a second operational component operatively connected to the second coupling component, the second operational component being selectively driven by and providing power to the power transfer mechanism, a second regenerative system operatively connected to the second operational component and being configured to recover regenerated energy from the second system, and an energy storage system operatively connected to the power transfer mechanism and being configured to store energy including the regenerated energy recovered from the first system and the second system, including:

directing a rotational input to the power transfer mechanism from the first system to transfer regenerated energy from the first system to the power transfer mechanism;

directing a rotational output from the power transfer mechanism to the second system to transfer at least some of the regenerated energy from the first system to the second system;

directing a rotational input to the power transfer mechanism from the second system to transfer regenerated energy from the second system to the power transfer mechanism; and directing a rotational output from the power transfer mechanism to the first system to transfer at least some of the regenerated energy from the second system to the first system.

12. The method of claim 11, wherein the energy transfer system includes an energy storage system and further including the step of operatively connecting the energy storage system to the power transfer mechanism.

13. The method of claim 12, further including the step of providing a stored energy rotational input from the energy storage system to the power transfer mechanism to transfer at least some stored energy from the energy storage system to the second system.

14. The method of claim 12, wherein the second system includes the energy storage system and further including storing at least some of the regenerated energy in the energy storage system.

15. The method of claim 11, wherein the energy transfer system includes a prime mover operatively connected to the power transfer mechanism and further includes directing a prime mover rotational input to the power transfer mechanism to provide additional rotational input through the power transfer mechanism to the second system.

16. The method of claim 11, wherein the energy transfer system includes a hydraulic actuator, and further including rotating a second pump-motor operatively connected to the power transfer mechanism to direct fluid pressure to one end of the hydraulic actuator.

17. The method of claim 11, wherein the regenerative system includes a hydraulic actuator, and further including forcing hydraulic fluid from one end of the hydraulic actuator to the pump-motor to rotate the pump-motor and provide the rotational input to the power transfer mechanism from the first system.

18. The method of claim 11, wherein the regenerative system includes a hydraulic regenerative braking system, and further including forcing hydraulic fluid from the regenerative braking system to the pump-motor to provide the rotational input to the power transfer mechanism from the first system.

19. The method of claim 11, wherein the energy transfer system includes a third system having an electric drive system with a generator operatively connected to the power transfer mechanism and a propulsion motor for driving a tractive component, and an electrical regenerative braking system operatively connected to the generator, and further including the step of rotating the generator to provide an electrically generated input to the second system.

* * * * *